(12) United States Patent
Ogawa

(10) Patent No.: US 10,572,780 B2
(45) Date of Patent: Feb. 25, 2020

(54) PRINTING APPARATUS, PRINTING CONTROL METHOD, AND RECORDING MEDIUM

(71) Applicant: CASIO COMPUTER CO., LTD., Shibuya-ku, Tokyo (JP)

(72) Inventor: Naoki Ogawa, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/982,234

(22) Filed: May 17, 2018

(65) Prior Publication Data

US 2018/0365539 A1 Dec. 20, 2018

(30) Foreign Application Priority Data

Jun. 15, 2017 (JP) .................................. 2017-117326

(51) Int. Cl.
*G06K 15/02* (2006.01)
(52) U.S. Cl.
CPC ........... *G06K 15/02* (2013.01); *G06K 15/022* (2013.01)
(58) Field of Classification Search
CPC combination set(s) only.
See application file for complete search history.

(56) References Cited

U.S. PATENT DOCUMENTS

| | | | |
|---|---|---|---|
| 6,671,856 B1 * | 12/2003 | Gillam | G06F 17/2735 382/229 |
| 2004/0017576 A1 * | 1/2004 | Nakagawa | H04N 1/2307 358/1.2 |
| 2005/0057761 A1 * | 3/2005 | Sakai | B41J 3/4075 358/1.2 |
| 2005/0162504 A1 | 7/2005 | Terao et al. | |
| 2006/0263132 A1 | 11/2006 | Yamamoto et al. | |
| 2017/0341379 A1 * | 11/2017 | Umeda | B41J 2/04548 |
| 2018/0367684 A1 * | 12/2018 | Tsuji | B41J 11/663 |

FOREIGN PATENT DOCUMENTS

| | | |
|---|---|---|
| CN | 1644385 A | 7/2005 |
| CN | 1708407 A | 12/2005 |
| JP | 2000141774 A | 5/2000 |

OTHER PUBLICATIONS

Chinese Office Action dated Nov. 12, 2019 (and English translation thereof) issued in Chinese Application No. 201810617239.1.

* cited by examiner

*Primary Examiner* — Helen Zong
(74) *Attorney, Agent, or Firm* — Holtz, Holtz & Volek PC

(57) ABSTRACT

A printing apparatus comprises: a processor configured to create print data for printing at least one printable character so as to arrange the printable character along a widthwise direction of the print medium based on input data input by a user; and a printhead configured to print on the print medium in accordance with the print data, wherein the processor compares an overall print length of overall data obtained by adding margins to a front end and a rear end of the printable character with a first length of an elongated print medium in the widthwise direction, and, the processor creates the print data including a mark indicating an end portion of the overall data when the overall print length is shorter than the first length.

7 Claims, 18 Drawing Sheets

PRINTING APPARATUS, PRINTING CONTROL METHOD, AND RECORDING MEDIUM

CROSS-REFERENCE TO RELATED APPLICATIONS

This application is based upon and claims the benefit of priority under 35 USC 119 of Japanese Patent Application No. 2017-117326 filed on Jun. 15, 2017 the entire disclosure of which, including the description, claims, drawings, and abstract, is incorporated herein by reference in its entirety.

BACKGROUND OF THE INVENTION

This specification relates to a printing apparatus, a printing method, and a program.

DESCRIPTION OF THE RELATED ART

Conventionally, a printing apparatus configured to create a label by printing on a tape can create a label on which a character string image having an arbitrary desired size is printed, when using a wide tape, while saving extra trouble for label creation and reducing a waste of the tape by printing in accordance with the widthwise direction of the tape (JP 2000-141774 A).

In the printing apparatus disclosed in JP 2000-141774 A, however, when the overall print length of overall data with margins having predetermined widths being added to the front and rear ends of a character string image is shorter than the width of a tape in the wide widthwise direction, a margin wider than a margin having a predetermined width is formed on at least one end side of the tape in the wide widthwise direction, resulting in creating a label having printable characters with an unbalanced layout.

BRIEF SUMMARY

According to an embodiment of the present invention, a printing apparatus characterized by comprising: a processor configured to create print data for printing at least one printable character so as to arrange the printable character along a widthwise direction of the print medium based on input data input by a user; and a printhead configured to print on the print medium in accordance with the print data, wherein the processor compares an overall print length of overall data obtained by adding margins to a front end and a rear end of the printable character with a first length of an elongated print medium in the widthwise direction, and, the processor creates the print data including a mark indicating an end portion of the overall data when the overall print length is shorter than the first length.

According to an embodiment of the present invention, a printing method of printing on an elongated print medium by using a printhead, comprises: a step of recognizing a first length of the print medium in a widthwise direction; a step of creating print data for printing at least one printable character so as to arrange the printable character along the widthwise direction of the print medium based on input data input by a user; and a step of printing on the print medium in accordance with the print data, wherein in the step of creating the print data, an overall print length of overall data obtained by adding margins to a front end and a rear end of the printable character based on the input data is compared with the first length, and, when the overall print length is shorter than the first length, the print data is created to include, on the print medium, a mark indicating an end portion of the overall data so as to make the overall data have the overall print length.

According to an embodiment of the present invention, a recording medium recording a program readable by a computer of a printing apparatus, the program causing a processor of the printing apparatus to execute: a process of creating print data for printing at least one printable character so as to arrange the printable character along a widthwise direction of the print medium based on input data input by a user; and a process of printing on the print medium in accordance with the print data, wherein the process of creating the print data is a process of comparing an overall print length of overall data obtained by adding margins to a front end and a rear end of the printable character based on the input data with a first length, and, when the overall print length is shorter than the first length, creating the print data including, on the print medium, a mark indicating an end portion of the overall data so as to make the overall data have the overall print length.

DETAILED DESCRIPTION OF THE INVENTION

Figure 1:
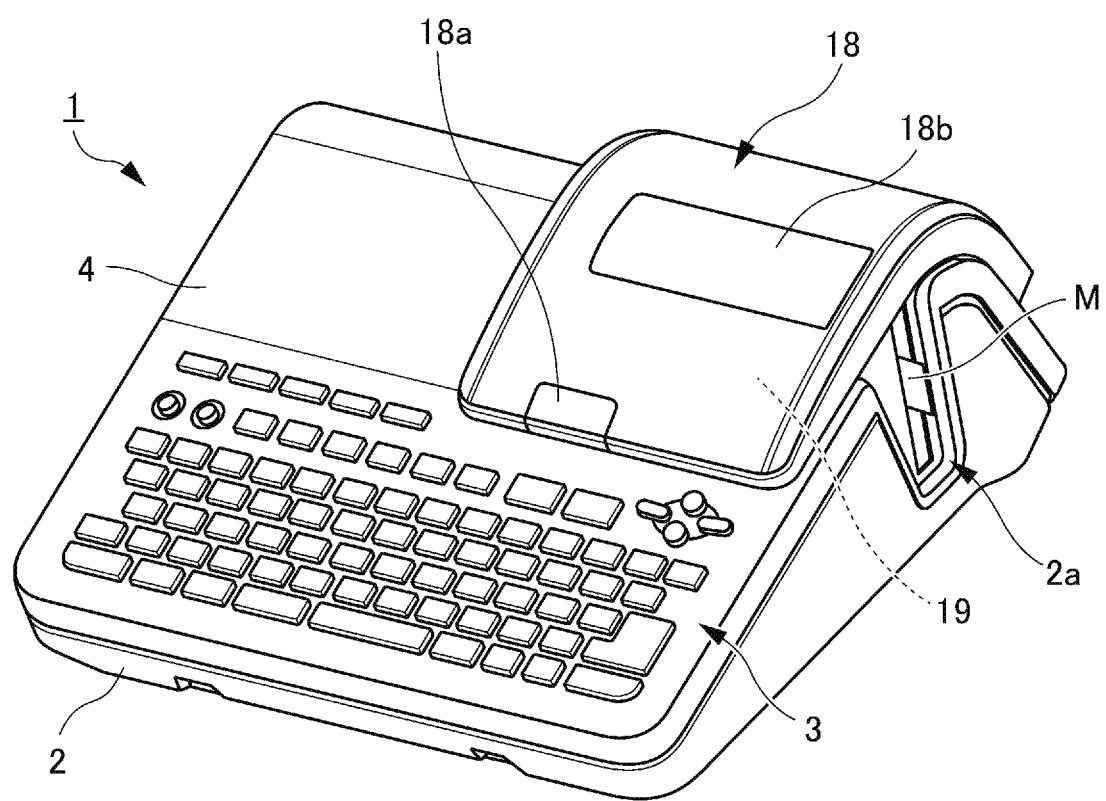
FIG. 1 is a perspective view of a printing apparatus.

A mode (to be referred to as an "embodiment" hereinafter) for carrying out the present invention will be described below with reference to the accompanying drawings. Note that the same reference numerals denote the same elements throughout the description of the embodiment.

[Configuration of Printing Apparatus 1]

The configuration of a printing apparatus 1 according to an embodiment of the present invention will be described in detail below with reference to FIGS. 1 to 5.

FIG. 1 is a perspective view of the printing apparatus 1 according to the embodiment of the present invention. The printing apparatus 1 includes a thermal head 10 that prints on a print medium M and is, for example, a label printer configured to print on the elongated print medium M by a single pulse scheme.

The following will exemplify a label printer based on a thermal transfer scheme using an ink ribbon R. However, the printing scheme to be used is not specifically limited. For example, a thermal scheme using thermal sensitive sheets may be used.

The print medium M may be a tape member including a base material having an adhesive layer and a release liner releasably attached to the base material so as to cover the adhesive layer, or a tape member without any release liner.

As shown in FIG. 1, the printing apparatus 1 includes an apparatus housing 2, an input unit 3, a display unit 4, an openable lid 18, and a cassette housing portion 19.

The input unit 3, the display unit 4, and the openable lid 18 are arranged on the upper surface of the apparatus housing 2.

Although not shown, the apparatus housing 2 is provided with a power cord connecting terminal, an external equipment connecting terminal, a storage medium insertion opening, and the like.

The printing apparatus 1 can choose between a lengthwise printing mode of printing on the print medium M along the lengthwise direction and a widthwise printing mode of printing on the print medium M along the widthwise direction. The apparatus chooses between the lengthwise printing mode and the widthwise printing mode in accordance with an input to the input unit 3.

The input unit 3 includes various types of keys including an input key, an arrow key, a conversion key, and a decision key. The display unit 4 is, for example, a liquid crystal display panel, which displays a selection menu for various types of settings such as a character corresponding to an input from the input unit 3, messages concerning various types of processing, and the like.

The display unit 4 may also display the progress of printing processing during printing by displaying information about a character, graphic pattern, or the like (a character, graphic pattern, symbol, or the like will sometimes be referred to as a printable character hereinafter) for which an instruction to print on the print medium M has been issued.

Note that the display unit 4 may be provided with a touch panel unit. In this case, the display unit 4 may be regarded as part of the input unit 3.

The display unit 4 may also display a predetermined message upon detection of an abnormality in the printing apparatus 1, thereby notifying the user of the abnormality in the printing apparatus 1.

That is, the display unit 4 is a notifying unit for notifying an abnormality in the printing apparatus 1.

The openable lid 18 is openably placed on the upper portion of the cassette housing portion 19. When a button 18a is pushed, the openable lid 18 is opened.

A window 18b is formed on the openable lid 18 to allow a visual check to determine whether a tape cassette 30 (see FIG. 2) is housed in the cassette housing portion 19 even while the openable lid 18 is closed.

A discharge opening 2a is formed in a side surface of the apparatus housing 2. The print medium M on which printing has been performed in the printing apparatus 1 is discharged outside the apparatus through the discharge opening 2a.

Figure 2:
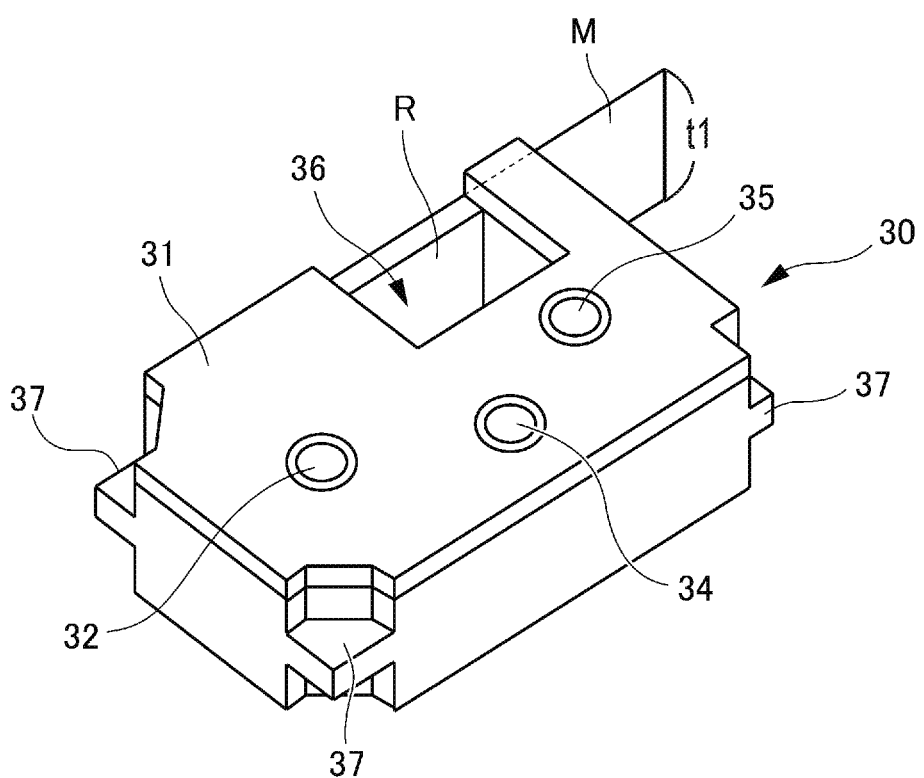
FIG. 2 is a perspective view of a tape cassette housed in the printing apparatus.
Figure 3:
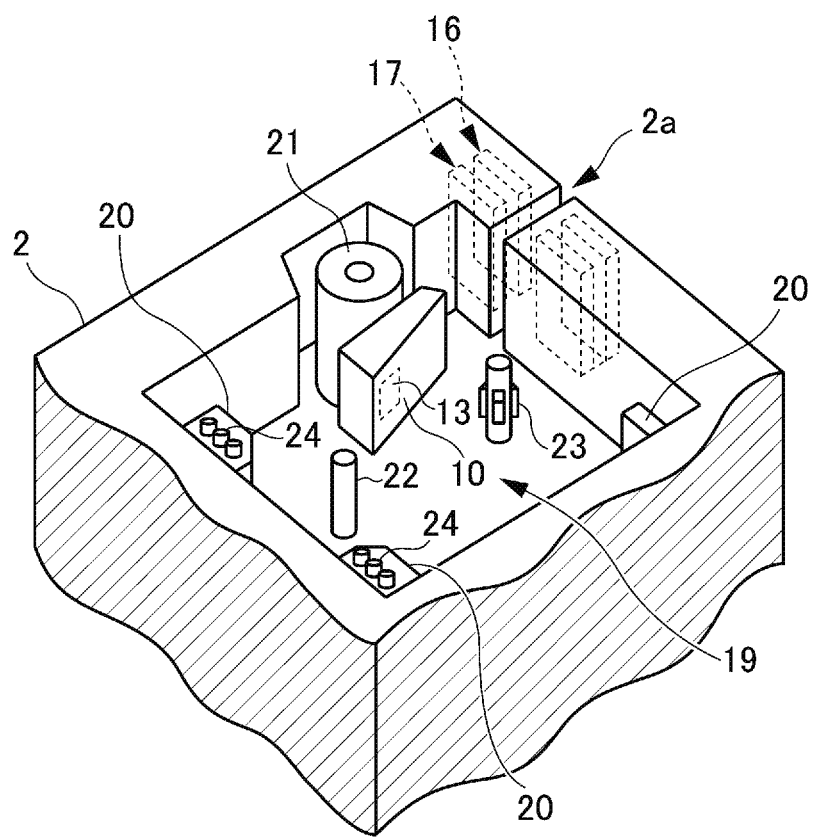
FIG. 3 is a perspective view of the cassette housing portion of the printing apparatus.
Figure 4:
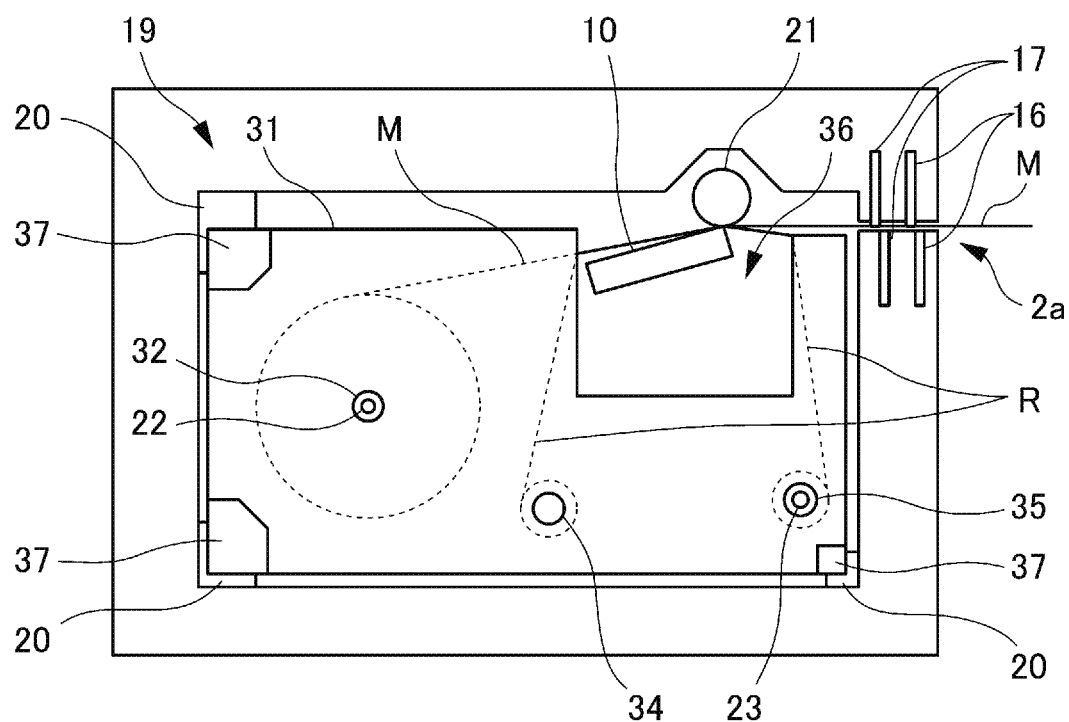
FIG. 4 is a sectional view of the printing apparatus.

FIG. 2 is a perspective view of the tape cassette 30 housed in the printing apparatus 1. FIG. 3 is a perspective view of the cassette housing portion 19 of the printing apparatus 1. FIG. 4 is a sectional view of the printing apparatus 1.

The tape cassette 30 shown in FIG. 2 is detachably housed in the cassette housing portion 19 shown in FIG. 3. FIG. 4 shows a state in which the tape cassette 30 is housed in the cassette housing portion 19.

As shown in FIG. 2, the tape cassette 30 has a cassette case 31 having a thermal head insertion portion 36 and an engaging portion 37 and is configured to house the print medium M and the ink ribbon R.

The cassette case 31 is provided with a tape core 32, an ink ribbon supply core 34, and an ink ribbon take-up core 35.

The print medium M is rolled around the tape core 32 in the cassette case 31 (see FIG. 4).

The thermal transfer ink ribbon R is rolled around the ink ribbon supply core 34 in the cassette case 31 while the distal end of the ink ribbon R is wound around the ink ribbon take-up core 35 (see FIG. 4).

The cassette housing portion 19 of the apparatus housing 2 is provided with a plurality of cassette receiving portions 20 for supporting the tape cassette 30 at a predetermined position, as shown in FIG. 3.

The cassette receiving portions 20 are also provided with tape width recognition switches 24 for the recognition of the width of a tape (print medium M) housed in the tape cassette 30.

The tape width recognition switches 24 are width recognition portions for the recognition of the width (first length t1) of the elongated print medium M in the widthwise direction based on the shape of a cassette.

The cassette housing portion 19 further has a plurality of heat generating elements 10a and is provided with the thermal head 10 for printing on the print medium M, a platen roller 21 as a conveying unit for conveying the print medium M, a tape core engaging shaft 22, and an ink ribbon take-up driving shaft 23.

Although not shown, the plurality of heat generating elements 10a are arrayed on a line corresponding to the lengthwise direction of the print medium M and a line corresponding to the widthwise direction of the print medium M while the tape cassette 30 is housed in the cassette housing portion 19.

A thermistor 13 is embedded in the thermal head 10. The thermistor 13 is a head temperature measurement unit for measuring the temperature of the thermal head 10.

As shown in FIG. 4, while the tape cassette 30 is housed in the cassette housing portion 19, the engaging portion 37 provided on the cassette case 31 is supported by the cassette receiving portions 20 provided in the cassette housing portion 19, and the thermal head 10 is inserted into the thermal head insertion portion 36 formed in the cassette case 31.

The tape core 32 of the tape cassette 30 is engaged with the tape core engaging shaft 22, and the ink ribbon take-up core 35 is engaged with the ink ribbon take-up driving shaft 23.

When a print instruction is input to the printing apparatus 1, the print medium M is fed from the tape core 32 upon rotation of the platen roller 21.

At this time, as the ink ribbon take-up driving shaft 23 rotates in synchronism with the platen roller 21, the ink ribbon R is fed, together with the print medium M, from the ink ribbon supply core 34.

With this operation, the print medium M and the ink ribbon R are conveyed in a stacked state. When the ink ribbon R passes between the thermal head 10 and the platen roller 21, the ink ribbon R is heated by the thermal head 10, and ink is transferred onto the print medium M, thereby performing printing.

The used ink ribbon R that has passed between the thermal head 10 and the platen roller 21 is taken up by the ink ribbon take-up core 35.

The printed print medium M that has passed between the thermal head 10 and the platen roller 21 is cut by a half-cut mechanism 16 and a full-cut mechanism 17 and discharged from the discharge opening 2a.

Figure 5:
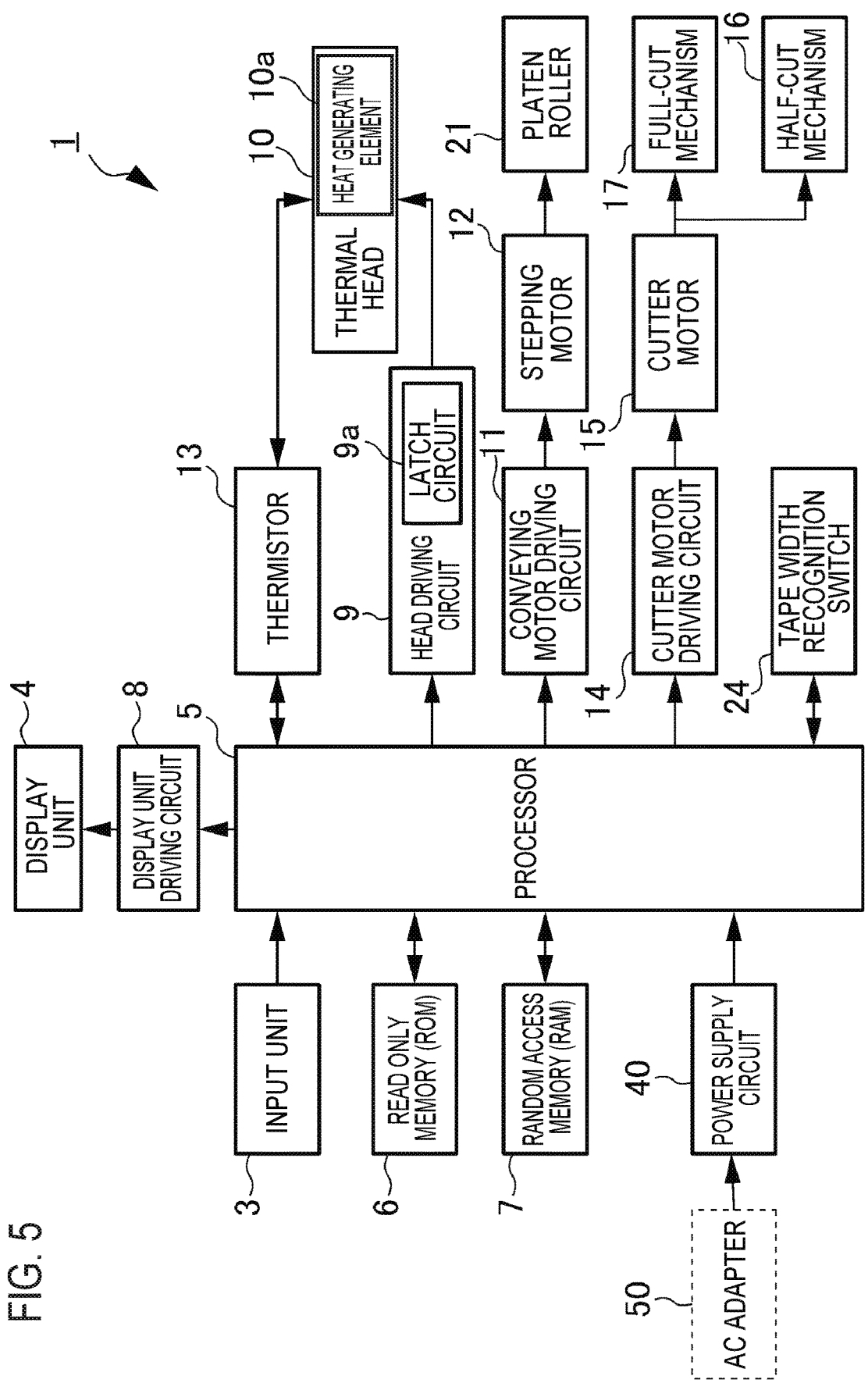
FIG. 5 is a block diagram showing the hardware configuration of the printing apparatus.

FIG. 5 is a block diagram showing the hardware configuration of the printing apparatus 1.

In addition to the input unit 3, the display unit 4, the thermal head 10, the thermistor 13, the half-cut mechanism 16, the full-cut mechanism 17, the platen roller 21, and the tape width recognition switch 24 described above, the printing apparatus 1 includes a processor 5, a read only memory (ROM) 6, a random access memory (RAM) 7, a display unit driving circuit 8, a head driving circuit 9, a conveying motor driving circuit 11, a stepping motor 12, a cutter motor driving circuit 14, a cutter motor 15, and a power supply circuit 40.

Note that at least the processor 5, the ROM 6, and the RAM 7 constitute a computer for the printing apparatus 1.

The processor 5 includes, for example, a central processing unit (CPU).

The processor 5 controls the operation of each unit of the printing apparatus 1 by executing a program stored in the ROM 6.

The processor 5 supplies, for example, control signals (a strobe signal, latch signal, and clock signal) and print data to the head driving circuit 9 and controls the thermal head 10 via the head driving circuit 9.

The processor 5 controls the motors (the stepping motor 12 and the cutter motor 15) via the motor driving circuits (the conveying motor driving circuit 11 and the cutter motor driving circuit 14).

Each function of the processor 5 may be implemented by a dedicated module (hardware) or implemented by executing a program (software) stored in the ROM 6.

The ROM 6 stores programs for printing on the print medium M and various types of data (for example, fonts, an energization table, a printable character interval, margins having predetermined widths, and the widths of regions provided with the plurality of heat generating elements 10a of the thermal head 10 in the widthwise direction) necessary for the execution of programs.

The ROM 6 functions as a storage medium for storing programs that can be read by the processor 5.

The RAM 7 temporarily stores input data including a printable character string input by the user and the first length t1 of the elongated print medium M in the widthwise direction which is recognized by the tape width recognition switches 24.

The RAM 7 further includes a display data storage unit that temporarily stores display data.

The display unit driving circuit 8 controls the display unit 4 on the basis of display data stored in the RAM 7.

The display unit 4 may display, for example, the contents of printing in a form that allows recognition of the progress of printing processing under the control of the display unit driving circuit 8.

The head driving circuit 9 is a head driving unit that drives the thermal head 10 on the basis of control signals and print data supplied from the processor 5, and includes a latch circuit 9a that holds the print data.

More specifically, in an energization period during which a strobe signal is ON, the head driving circuit 9 controls energization or de-energization of voltages with respect to the plurality of heat generating elements 10a on the basis of print data output from the latch circuit 9a.

The thermal head 10 is a printing unit having the plurality of heat generating elements 10a arrayed along the lengthwise direction and the widthwise direction of the print medium M. The head driving circuit 9 causes the heat generating elements 10a to generate heat to heat the ink ribbon R by selectively supplying currents to the heat generating elements 10a in accordance with print data output from the latch circuit 9a during an energization period designated by a strobe signal supplied from the processor 5.

This makes the thermal head 10 print line by line on the print medium M by thermal transfer.

That is, the printing apparatus 1 according to this embodiment is a thermal line printer.

The conveying motor driving circuit 11 drives the stepping motor 12. The stepping motor 12 rotates the platen roller 21.

The platen roller 21 is a conveying unit that is rotated by the driving force of the stepping motor 12 and conveys the print medium M in the lengthwise direction of the print medium M.

The cutter motor driving circuit 14 drives the cutter motor 15.

The half-cut mechanism 16 and the full-cut mechanism 17 operate by using the driving force of the cutter motor 15 to half-cut or full-cut the print medium M along cut-lines.

Note that to "full-cut" is to cut the base material of the print medium M together with the release liner along the widthwise direction, and to "half-cut" is to cut only the base material along the widthwise direction.

The power supply circuit 40 is a power supply unit that generates an output voltage from a DC voltage (for example, 24 V) from an AC adapter 50 and supplies power to each unit of the printing apparatus 1.

The widthwise printing mode used by the printing apparatus 1 according to the embodiment of the present invention will be described below in detail with reference to FIGS. 6 to 18.

Note that the lengthwise printing mode of the printing apparatus 1 is a generally used mode, and hence a description of the mode will be omitted.

The tape width recognition switch 24 recognizes in advance the first length t1 (see FIG. 9) of the elongated print medium M in the widthwise direction while the tape cassette 30 is housed in the cassette housing portion 19. The recognized first length t1 is temporarily stored in the RAM 7.

First of all, the user inputs printable character strings with the input unit 3. The input data including the plurality of printable character strings input by the user are temporarily stored in the RAM 7.

Subsequently, when the user selects the widthwise printing mode, widthwise printing starts.

<Widthwise Printing>

The contents of widthwise printing will be described in detail below with reference to FIG. 6 that is a flowchart showing an overall procedure for widthwise printing.

For example, a second length t2 of the region in which the plurality of heat generating elements 10a of the thermal head 10 are provided in the widthwise direction is known in advance because the thermal head 10 is one of the components of the apparatus and is stored in the ROM 6.

In step S10, the processor 5 compares the second length t2 of the region in which the plurality of heat generating elements 10a of the thermal head 10 are provided in the widthwise direction, which is read out from the ROM 6, with the first length t1 of the elongated print medium M in the widthwise direction, which is read out from the RAM 7.

Figure 9:
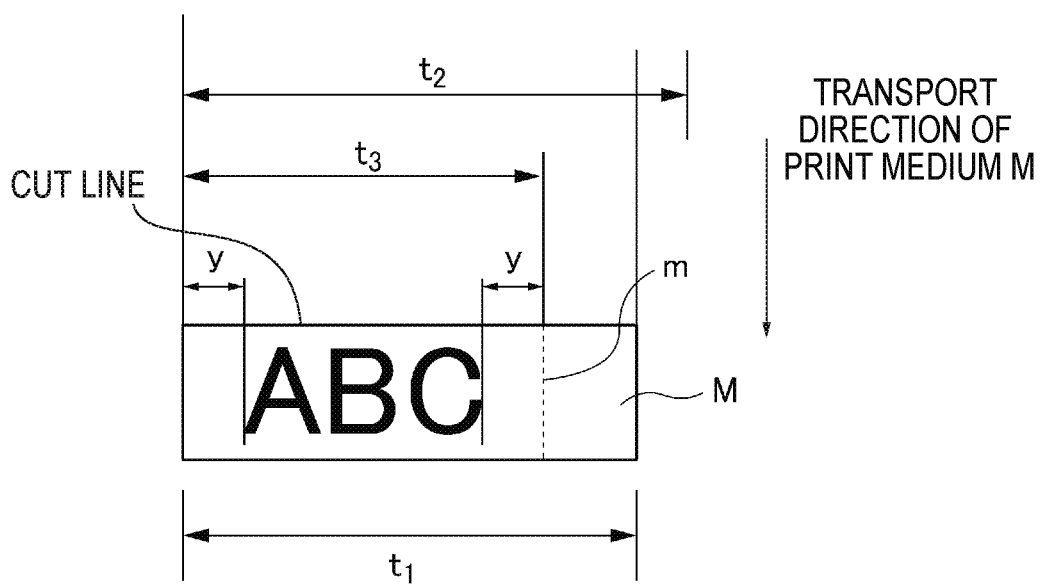
FIG. 9 is a schematic view of a print medium on which printing is performed along the widthwise direction with cut marks being added in accordance with 1-line first print data.

As shown in FIG. 9, if the second length t2 is equal to or more than the first length t1 (YES), that is, the thermal head 10 can print on the overall print medium M in the widthwise direction with the thermal head 10, the processor 5 performs first print data creation processing (step S20) for the creation of first print data.

The first print data creation processing (step S20) will be described in detail later.

In contrast, if the second length t2 is shorter than the first length t1 (NO), that is, the thermal head 10 cannot print on the overall print medium M in the widthwise direction, the processor 5 performs second print data creation processing (step S30) for the creation of second print data.

The second print data creation processing (step S30) will be described in detail later.

Upon completing the first print data creation processing (step S20) or second print data creation processing (step S30), the processor 5 shifts to printing/cutting processing (step S40).

When the process shifts to step S40, the head driving circuit 9 drives the thermal head 10 to print on the print medium M in accordance with the first print data or second print data created by the processor 5. In addition, the cutter motor driving circuit 14 drives the cutter motor 15 to make the half-cut mechanism 16 and the full-cut mechanism 17 operate to half-cut or full-cut the printed print medium M line by line along cut-lines on the basis of control signals from the processor 5. When step S40 is completed, widthwise printing is terminated.

<First Print Data Creation Processing>

The contents of the first print data creation processing (step S20) will be described in detail next with reference to FIG. 7 that is a flowchart for the first print data creation processing (step S20).

First of all, in step S21, the processor 5 compares a third length t3, which is the overall print length of overall data obtained by adding a margin having a predetermined width y read out from the ROM 6 to each of the front and rear ends of each of a plurality of the printable character strings based on the input data read out from the RAM 7, with the first length t1 of the elongated print medium M in the widthwise direction read out from the RAM 7.

As shown in FIG. 9, if the third length t3, which is the overall print length of the overall data, is equal to or shorter than the first length t1 of the print medium M in the widthwise direction (YES), the processor 5 performs 1-line first print data creation processing to create 1-line print data (step S22).

Note that the 1-line first print data creation processing (step S22) will be described in detail later.

In contrast, if the third length t3 is longer than the first length t1 (NO), the processor 5 performs plural-line first print data creation processing (step S23) to create print data of a plurality of lines.

Note that the plural-line first print data creation processing (step S23) will be described in detail later.

Figure 6:
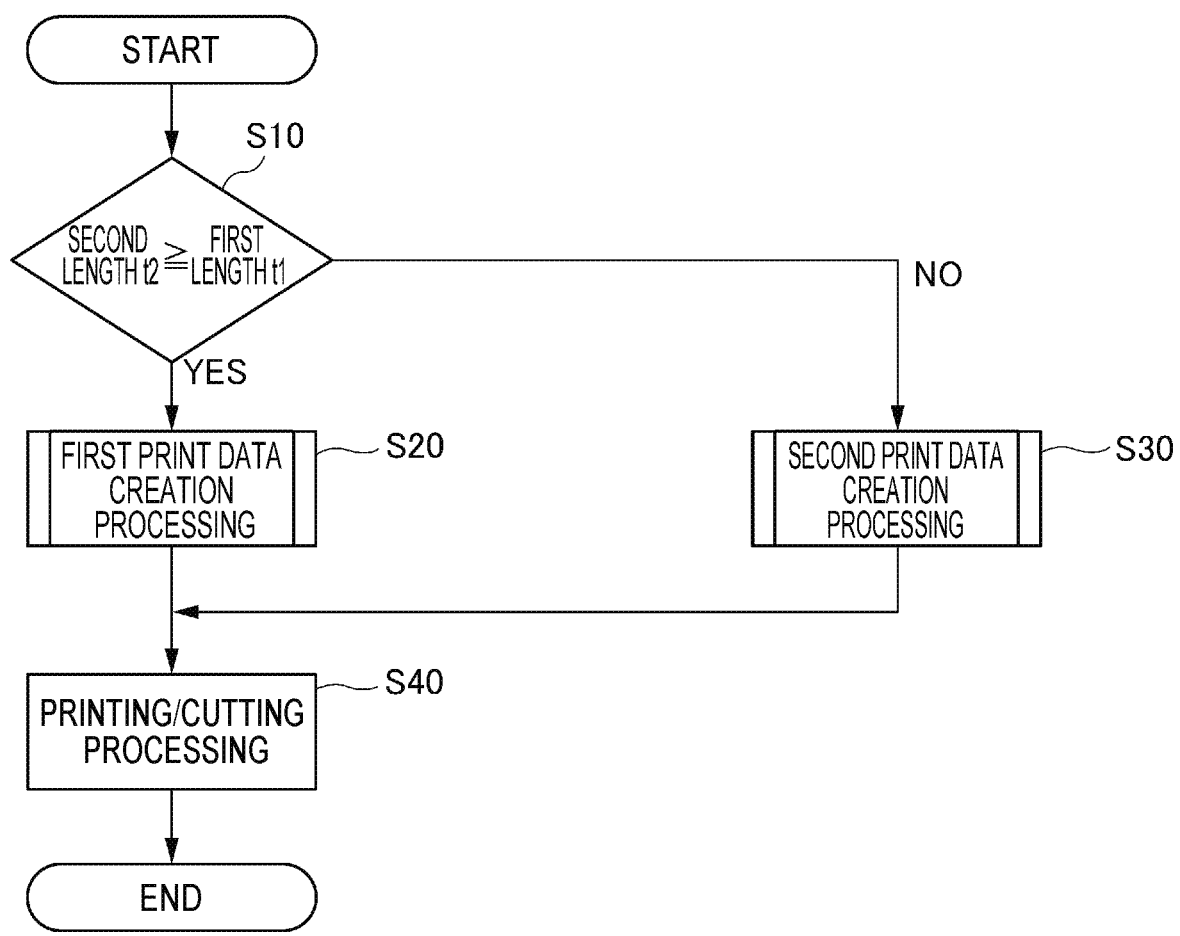
FIG. 6 is a flowchart for widthwise printing.

Upon completion of the 1-line first print data creation processing (step S22) or plural-line first print data creation processing (step S23), the process returns to the flowchart for the widthwise printing shown in FIG. 6.

<1-Line First Print Data Creation Processing>

Figure 8:
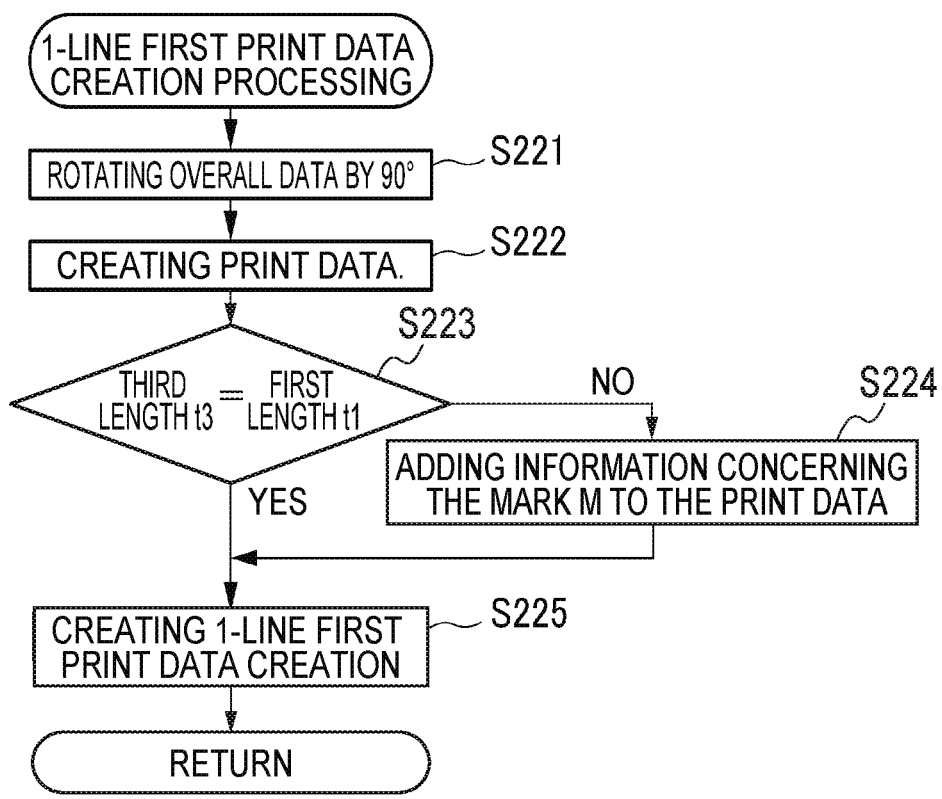
FIG. 8 is a flowchart for 1-line first print data creation processing in first print data creation processing.

The contents of the 1-line print data creation processing (step S22) will be described in detail with reference to FIG. 8, which is a flowchart for the 1-line first print data creation processing (step S22) in the first print data creation processing (step S20).

Note that FIG. 9 is a schematic view of the print medium M on which printing is performed along the widthwise direction, with a mark m being added, in accordance with 1-line first print data.

First of all, in step S221, the processor 5 rotates the overall data, obtained by adding the margin having the predetermined width y to each of the front and rear ends of each of a plurality of printable character strings based on input data, through 90° to develop the data along the widthwise direction of the print medium M.

As shown in FIG. 9, in step S222, the processor 5 then creates print data so as to form the margin having the predetermined width y on one end (left end) side such that the developed overall data aligns with one end (left end) side of the print medium M in the widthwise direction after printing.

In step S223, the processor 5 determines whether the third length t3, which is the overall print length of the overall data, is equal to the first length t1 of the print medium M in the widthwise direction.

In this case, if the third length t3 is equal to the first length t1 (YES), the processor 5 shifts to step S225, whereas if the third length t3 is not equal to the first length t1 (NO), the processor 5 shifts to step S224, as shown in FIG. 9.

Upon shifting to step S224, the processor 5 adds information concerning the mark m to the print data so as to make the distance from one end (left end) of the print medium M in the widthwise direction become the third length t3, which is the overall print length of the overall data after printing, as shown in FIG. 9. Subsequently, in step S225, the processor 5 sets, as 1-line first print data, the data obtained by adding the information concerning the mark m to the print data.

On the other hand, if the third length t3 is equal to the first length t1 and the process shifts from step S223 to step S225, the processor 5 sets the print data itself as 1-line first print data in step S225.

Figure 7:
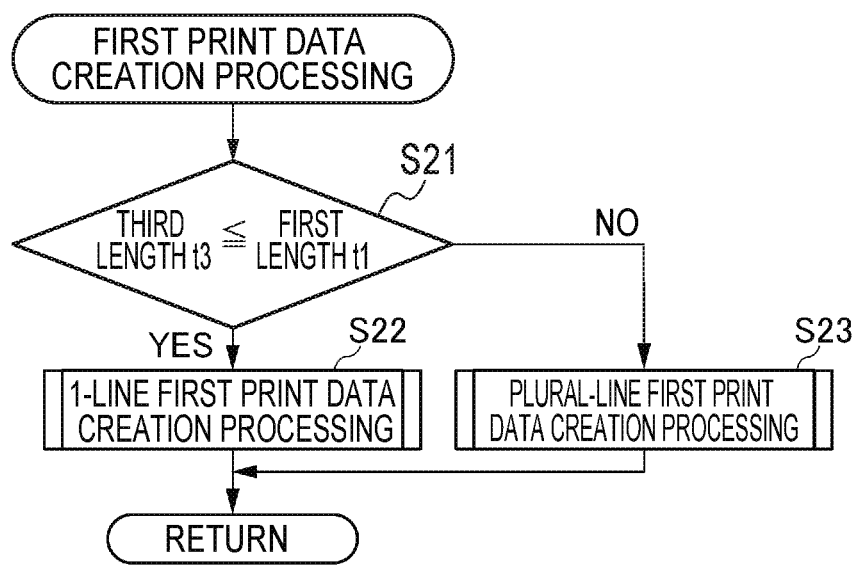
FIG. 7 is a flowchart for first print data creation processing.

Upon completion of step S225, the process returns to the flowchart for the first print data creation processing (step S20) shown in FIG. 7.

As described above, in the 1-line print data creation processing (step S22) in the first print data creation processing (step S20), if the third length t3, which is the overall print length of the overall data, is equal to the first length t1 of the print medium M in the widthwise direction, the printed print medium M is ready to be half-cut or full-cut along cut-lines.

For this reason, the processor 5 does not add the mark m indicating an end portion of the overall data to the print medium M, printed along the widthwise direction in accordance with 1-line first print data, so as to indicate the overall print length.

Assume that the third length t3, which is the overall print length of the overall data is shorter than the first length t1 of the print medium M in the widthwise direction. In this case, in order to equalize the right and left margins, the print medium M needs to be cut after being half-cut or full-cut along cut-lines so as to equalize the margins. For this reason, as shown in FIG. 9, the mark m indicating an end portion of the overall data is added to the print medium M, printed along the widthwise direction in accordance with 1-line first print data, so as to indicate the overall print length. Only cutting the print medium M along the mark m allows the cut print medium have the margins each having the predetermined width y.

<Plural-Line First Print Data Creation Processing>

Figure 10:
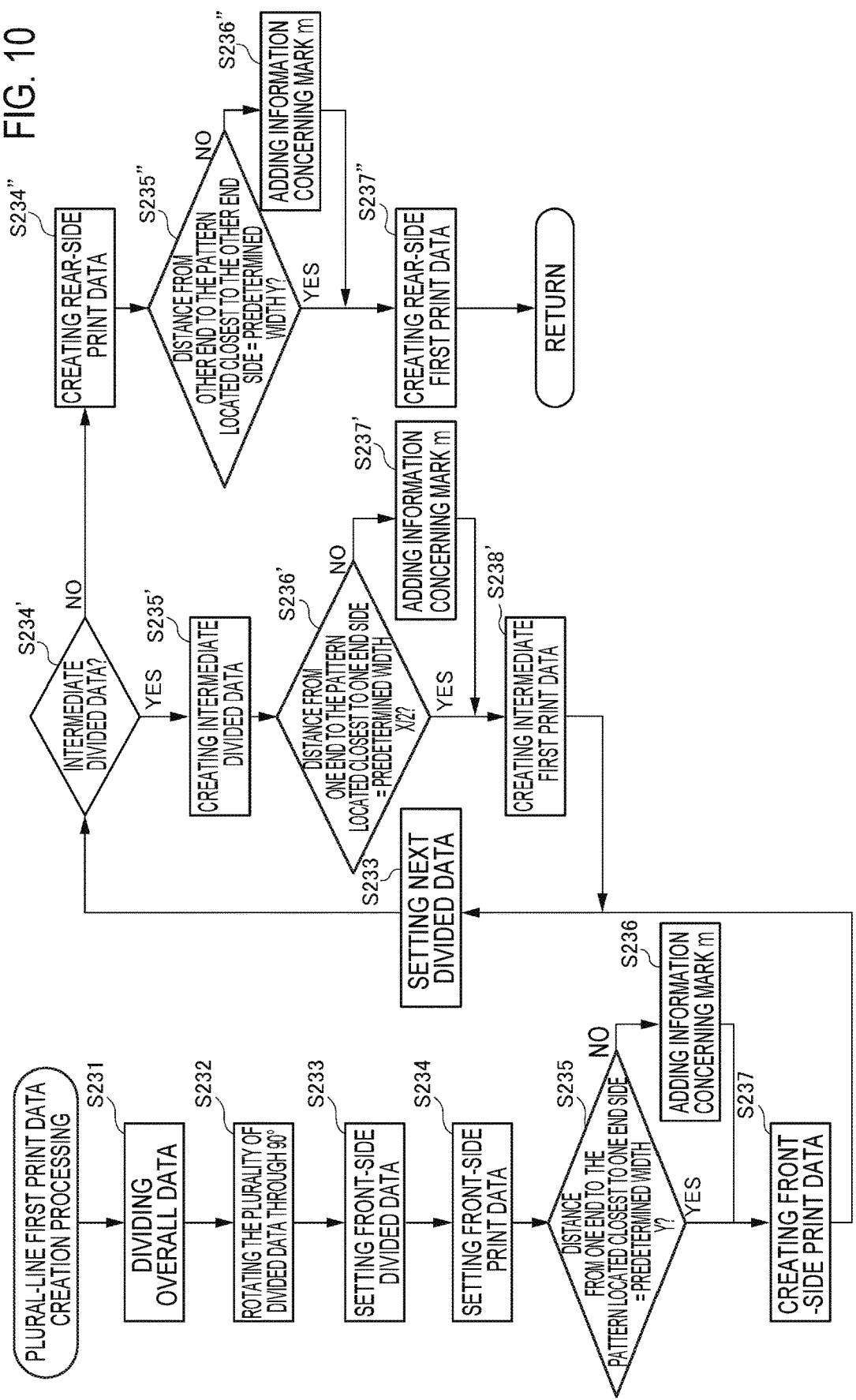
FIG. 10 is a flowchart for plural-line print data creation processing in first print data creation processing.

The contents of plural-line first print data creation processing (step S23) will be described next with reference to FIG. 10, which is a flowchart for plural-line first print data creation processing (step S23) in the first print data creation processing (step S20).

Figure 11:
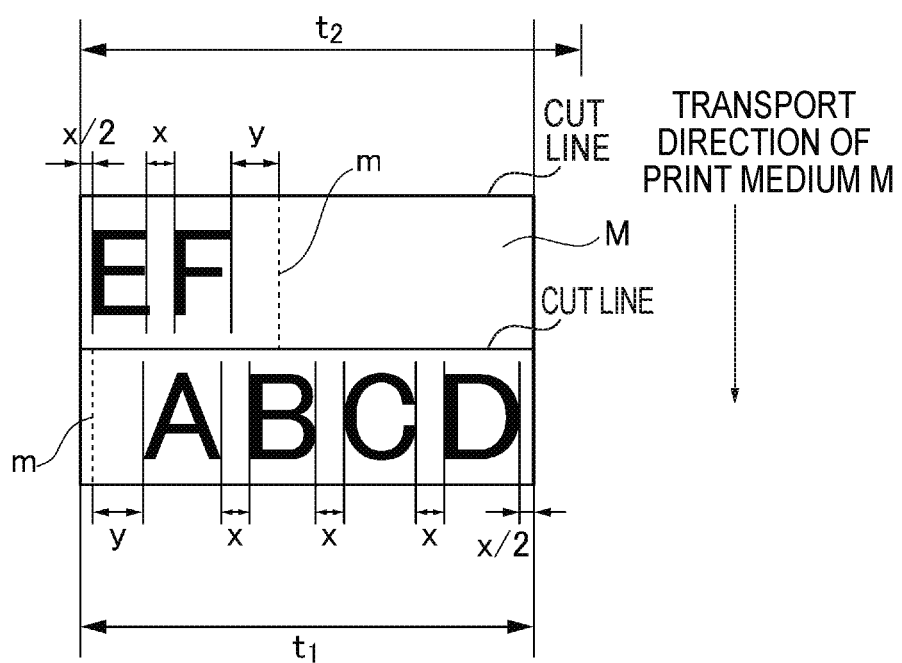
FIG. 11 is a schematic view of a print medium on which printing is performed along the widthwise direction with cut marks being added in accordance with 2-line first print data.
Figure 12:
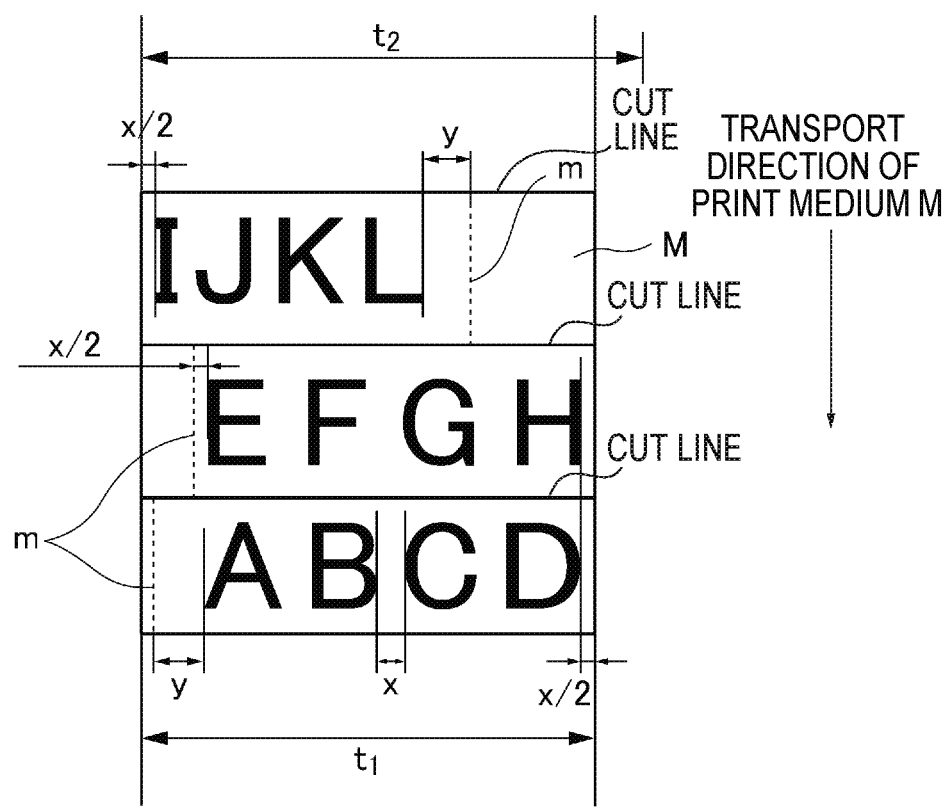
FIG. 12 is a schematic view of a print medium on which printing is performed along the widthwise direction with cut marks being added in accordance with 3-line first print data.

Note that FIG. 11 is a schematic view of the print medium M printed along the widthwise direction, with the marks m being added, in accordance with 2-line first print data, and FIG. 12 is a schematic view of the print medium M printed along the widthwise direction, with the marks m being added, in accordance with 3-line first print data.

First of all, in step S231, the processor 5 divides overall data having margins, each having the predetermined width y, added to the front and rear ends of a plurality of printable character strings based on input data into data each falling within the first length t1 of the print medium M in the widthwise direction.

Note that in the processing of creating a plurality of divided data by dividing the overall data in step S231, the overall data is divided at the intermediate position between adjacent printable characters of a plurality of printable character strings so as to create data each having the maximum width within the first length t1.

Assume that, as shown in FIG. 11, overall data can be divided into two data, each falling within the first length t1, that is, overall data is divided into front-side divided data (margin+ABCD) and rear-side divided data (EF+margin). In this case, the front-side divided data has the maximum width falling within the first length t1 when the overall data is divided at the intermediate position between D and E which are adjacent printable characters. For this reason, the boundary between the front-side divided data and the rear-side divided data is the intermediate position between D and E.

Assume that, as shown in FIG. 12, overall data can be divided into three divided data, each falling within the first length t1, that is, overall data is divided into front-side divided data (margin+ABCD), intermediate divided data (EFGH), and rear-side divided data (IJKL+margin). In this case, the front-side divided data has the maximum width falling within the first length t1 when the overall data is divided at the intermediate position between D and E, which are adjacent printable characters. For this reason, the boundary between the front-side divided data and the intermediate divided data is the intermediate position between D and E. In addition, the intermediate divided data has the maximum width falling within the first length t1 when the overall data is divided at the intermediate position between H and I, which are adjacent printable characters. For this reason, the boundary between the intermediate divided data and the rear-side divided data is the intermediate position between H and I.

Assume that when overall data is divided into four or more divided data, each divided data has the maximum length falling within the first length t1. In this case, all that happens is that a plurality of intermediated divided data are created.

In step S232, the processor 5 rotates the plurality of divided data through 90° to develop the data along the widthwise direction of the print medium M.

In step S233, the processor 5 sets the front-side divided data rotated through 90°.

Subsequently, in step S234, the processor 5 creates front-side print data so as to make the boundary of the front-side divided data coincide with the other end (right end) of the print medium M in the widthwise direction, as shown in FIG. 11 or 12.

Note that the front-side print data created in this manner is designed such that the distance from the other end (right end) of the print medium M in the widthwise direction to the printable character string located closest to the other end side of the print medium M in the widthwise direction becomes ½ of an interval x between printable characters.

In step S235, the processor 5 determines whether the distance from one end (left end) of the print medium M in the widthwise direction to the printable character string located closest to one end side of the print medium M in the widthwise direction after printing is equal to the predetermined width y. If the distance from one end (left end) of the print medium M in the widthwise direction to the printable character string located closest to one end of the print medium M in the widthwise direction after printing is equal to the predetermined width y (YES), the process shifts to step S237.

In contrast, if the distance from one end (left end) of the print medium M in the widthwise direction to the printable character string located closest to one end of the print medium M in the widthwise direction after printing is not equal to the predetermined width y (NO), the processor 5 shifts to step S236 to add information concerning the mark m to the front-side print data so as to display the mark m at a position where the distance from the printable character string located closest to one end side of the print medium M in the widthwise direction to the mark m after printing becomes the predetermined width y, as shown in FIG. 11 or 12. Thereafter, in step S237, the processor 5 sets, as front-side first print data, the data obtained by adding the information concerning the mark m to the front-side print data.

When the process shifts from step S235 to step S237, the processor 5 sets the front-side print data as front-side first print data without any change in step S237.

Subsequently, the processor 5 sets the next divided data having undergone 90° rotation in step S233'.

In step S234', the processor 5 determines whether the set next divided data is intermediate divided data.

Upon determining that the next divided data is intermediate divided data (YES), the processor 5 shifts to step S235'. In contrast, upon determining that the next divided data is not intermediate divided data (NO), that is, the next divided data is the rear-side divided data, the processor 5 shifts to step S234".

Upon shifting to step S235', as shown in FIG. 12, the processor 5 creates intermediate print data so as to make that the rear-side boundary of the intermediate divided data coincide with the other end (right end) of the print medium M in the widthwise direction.

Note that the intermediate print data created in this manner is designed such that the distance from the other end (right end) of the print medium M in the widthwise direction to the printable character string located closest to the other end side of the print medium M in the widthwise direction is ½ of the interval x between printable characters.

In step S236', the processor 5 determines whether the distance from one end (left end) of the print medium M in the widthwise direction to the printable character string located closest to one end side of the print medium M in the widthwise direction after printing is equal to ½ of the interval x between printable characters. If the distance from one end (left end) of the print medium M in the widthwise direction to the printable character string located closest to one end side of the print medium M in the widthwise direction after printing is equal to ½ of the interval x between printable characters (YES), the process shifts to step S238'.

In contrast, if the distance from one end (left end) of the print medium M in the widthwise direction to the printable character string located closest to one end side of the print medium M in the widthwise direction after printing is not equal to ½ of the interval x between printable characters (NO), the processor 5 shifts to step S237' to add the information concerning the mark m to the intermediate print data so as to display the mark m at a position where the distance from the printable character string located closest to one end side of the print medium M in the widthwise direction after printing to the mark m becomes ½ of the interval x, as shown in FIG. 12. Thereafter, in step S238', the processor 5 sets, as intermediate first print data, the data obtained by adding the information concerning the mark m to the intermediate print data.

When the process shifts from step S236' to step S238', the processor 5 sets the intermediate print data as intermediate first print data without any change.

When step S238' is completed, the process returns to step S233'.

That is, the processor 5 sets the next divided data having undergone 90° rotation.

If the next divided data is the second intermediate divided data, the processor 5 performs steps S234' to S238' again to create second intermediate first print data.

If, therefore, there are a plurality of intermediate divided data, the processor 5 creates intermediate first print data (first intermediate first print data, second intermediate first print data, . . . ) as many as the number of intermediate divided data.

If the divided data set after the process shifted from step S237' or S238' to step S233' is rear-side divided data, NO is obtained in step S234'. In step S234", the processor 5 creates rear-side print data so as to make the boundary of the rear-side divided data coincide with one end (left end) of the print medium M in the widthwise direction, as shown in FIG. 11 or 12.

Note that the rear-side print data created in this manner is designed such that the distance from one end (left end) of the print medium M in the widthwise direction to the printable character string located closest to one end side of the print medium M in the widthwise direction is ½ of the interval x between printable characters.

The processor 5 then determines in step S235" whether the distance from the other end (right end) of the print medium M in the widthwise direction to the printable character string located closest to the other end side of the print medium M in the widthwise direction after printing is equal to the predetermined width y. If the distance from the other end (right end) of the print medium M in the widthwise direction to the printable character string located closest to the other end side of the print medium M in the widthwise direction after printing is equal to the predetermined width y (YES), the process shifts to step S237".

If the distance from the other end (right end) of the print medium M in the widthwise direction to the printable character string located closest to the other end side of the print medium M in the widthwise direction after printing is not equal to the predetermined width y (NO), the process shifts to step S236", in which the processor 5 adds information concerning the mark m to the rear-side print data so as to display the mark m at a position where the distance from the printable character string located closest to the other end side of the print medium M in the widthwise direction to the mark m after printing becomes the predetermined width y, as shown in FIG. 11 or 12. Thereafter, in step S237", the processor 5 sets, as rear-side first print data, the data obtained by adding the information concerning the mark m to the rear-side print data.

When the process shifts from step S235" to step S237", the processor 5 sets the rear-side print data as rear-side first print data.

When step S237" is completed and plural-line first print data having front-side first print data and rear-side first print data or plural-line first print data having front-side first print data, intermediate first print data (note that there are sometimes a plurality of intermediate first print data), and rear-side first print data is created, the process returns to the flowchart for first print data creation processing (step S20) shown in FIG. 7.

With the above processing, plural-line first print data for printing like that shown in FIGS. 11 and 12 is created.

Printing like that shown in FIG. 11 is performed such that the boundary of print data is located at the intermediate position between D and E, which are printable characters, the distance from printable character "D" to the other end (right end) of the print medium M in the widthwise direction is ½ of the interval x of the printable character array, and the distance from printable character "E" to one end (left end) of the print medium M in the widthwise direction is ½ of the interval x of the printable character array.

Only connecting the other end (right end) of the print medium M of the first-line print portion to one end (left end) of the print medium M of the second-line print portion so as to place them in contact with each other makes it possible to make the interval x between printable characters "D" and "E" equal to the interval x between other printable characters. Because each end of the print medium M each has extremely accurate, mechanically formed linear shape, it is possible to prevent the occurrence of a gap at the boundary, thereby connecting the print portions with good appearance.

The marks m are printed at the position where the margin is removed from front-side printable character "A" and at the position where the margin is removed from rear-side printable character "F". Accordingly, only cutting the print portions along the marks m after printing can allow the overall print portion obtained by connecting the print portions to have the third length t3, which is the overall print length of the overall data.

In the case shown in FIG. 12 as well, the marks m are printed at proper positions that make the overall print portion obtained by connecting the portions printed along the respective first print data after printing (the front-side first print data, the intermediate first print data, and the rear-side first print data) have the third length t3 and also equalize the intervals x of the plurality of printable character strings.

As described above, in the plural-line first print data creation processing (step S23) in the first print data creation processing (step S20), the processor 5 creates plural-line first print data having a plurality of first print data for printing the marks m indicating the end portions of a plurality of print data such that the overall print portion obtained by connecting the portions printed along the plurality of first print data obtained by dividing the third length t3 into lengths each falling within the first length t1 has the third length t3 after printing and the intervals x of a plurality of printable character strings are equalized.

Accordingly, the user is only required to perform cutting along the marks m and connect the respective cut print media M to each other.

Note that a boundary of print data need not always be the intermediate position between adjacent printable characters.

Obviously from the print portion (see the print portion of printable characters "EFGH") based on the intermediate first print data in FIG. 12, the user cuts the portion on the printable character "E" side along the mark m after printing. If the mark m is provided near the printable character, the user may damage the portion of the printable character even when the cutting position is slightly shifted within the range in which no problem occurs in terms of appearance when cut printable character portions are connected to each other.

In contrast to this, as in this embodiment, when the mark m is provided at the intermediate position between adjacent printable characters, the printable character are not damaged as long as the cutting position is slightly shifted. It is therefore preferable that a boundary of print data is set at the intermediate position between the adjacent printable characters.

<Second Print Data Creation Processing>

The processing to be performed when the process shifts to the second print data creation processing (step S30) in FIG. 6 will be described with reference to FIG. 13, which is a flowchart for second print data creation processing (step S30).

As described with reference to FIG. 6, the process shifts to second print data creation processing (step S30) when the second length t2 of the region in which the plurality of heat generating elements 10a of the thermal head 10 are provided in the widthwise direction is shorter than the first length t1 of the print medium M in the widthwise direction (NO).

For this reason, the processor 5 determines with reference to the second length t2 whether to perform printing in one line or perform printing upon dividing one line into a plurality of lines. This operation will be described in detail below with reference to FIG. 13.

First of all, in step S31, the processor 5 compares the third length t3, which is the overall print length of the overall data obtained by adding the margins each having the predetermined width y read out from the ROM 6 to the front and rear ends of a plurality of printable character strings based on input data read out from the RAM 7, with the second length t2 of the region in which the plurality of heat generating elements 10a of the thermal head 10 are provided, which is read out from the ROM 6.

If the third length t3 is equal to or less than the second length t2 (YES), the processor 5 performs 1-line second print data creation processing (step S32) for creating 1-line second print data.

The 1-line second print data creation processing (step S32) will be described in detail later.

In contrast, if the third length t3 is longer than the second length t2 (NO), the processor 5 performs plural-line second print data creation processing (step S33) for creating plural-line second print data.

Note that the plural-line second print data creation processing (step S33) will be described in detail later.

Upon completion of the 1-line second print data creation processing (step S32) or plural-line second print data creation processing (step S33), the process returns to the flowchart for widthwise printing shown in FIG. 6, in which the processor 5 performs printing and cutting (half-cutting or full-cutting) based on created print data in step S40, thus completing overall processing.

<1-Line Second Print Data Creation Processing>

Figure 14:
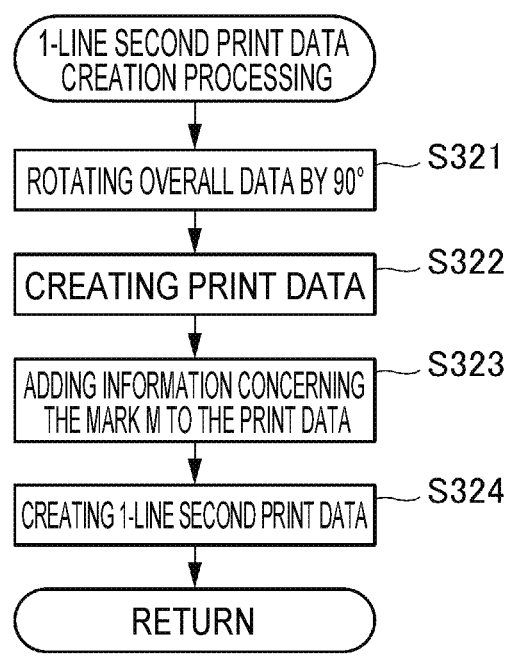
FIG. 14 is a flowchart for 1-line second print data creation processing in second print data creation processing.

The contents of the 1-line second print data creation processing (step S32) will be described with reference to FIG. 14, which is a flowchart for the 1-line second print data creation processing (step S32) in the second print data creation processing (step S30).

Figure 15:
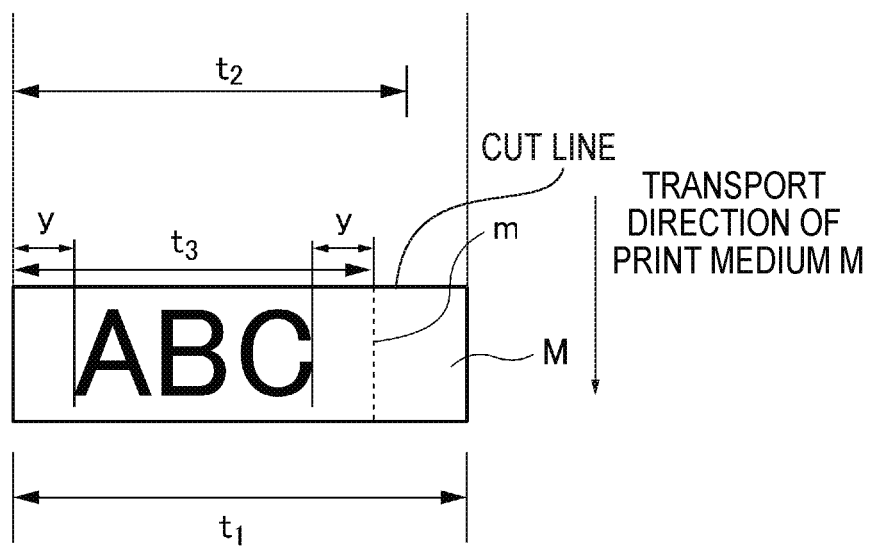
FIG. 15 is a schematic view of a print medium on which printing is performed along the widthwise direction with cut marks being added in accordance with 1-line second print data.

Note that FIG. 15 is a schematic view of the print medium M printed along the widthwise direction, with the mark m being added in accordance with 1-line second print data.

First of all, in step S321, the processor 5 rotates the overall data, obtained by adding margins each having the predetermined width y to the front and rear ends of a plurality of printable character strings based on input data, through 90° and develops the data along the widthwise direction of the print medium M.

In step S322, as shown in FIG. 15, the processor 5 creates print data, with a margin having the predetermined width y provided on one end side by making the developed overall data coincide with one end side of the print medium M in the widthwise direction after printing.

With this processing, as also described above, when the process has shifted to second print data creation processing, because the first length t1 of the print medium M in the widthwise direction is longer than the second length t2 of the region in which the plurality of heat generating elements 10a of the thermal head 10 are provided in the widthwise direction, an unnecessary marginal portion is always formed on the other end (right end) side of the print medium M in the widthwise direction.

For this reason, in step S323, as shown in FIG. 15, the processor 5 adds information concerning the mark m to the print data so as to display the mark m at a position where the distance from one end (left end) of the print medium M in the widthwise direction to the mark m after printing is equal to the third length t3, which is the overall print length of the overall data.

In step S324, the processor 5 sets the print data obtained by adding the information concerning the mark m to the print data as 1-line second print data. Upon completion of step S324, the process returns to the flowchart for the second print data creation processing (step S30) shown in FIG. 13.

With the above processing, when printing is performed in accordance with the created 1-line second print data, a print result like that shown in FIG. 15 is obtained. Because the mark m indicating an end portion of the overall data is added to the print medium M so as to make it have the overall print length, the user can obtain a print portion with the margin having the predetermined width y by only cutting the print medium M along the mark m.

<Plural-Line Second Print Data Creation Processing>

Figure 16:
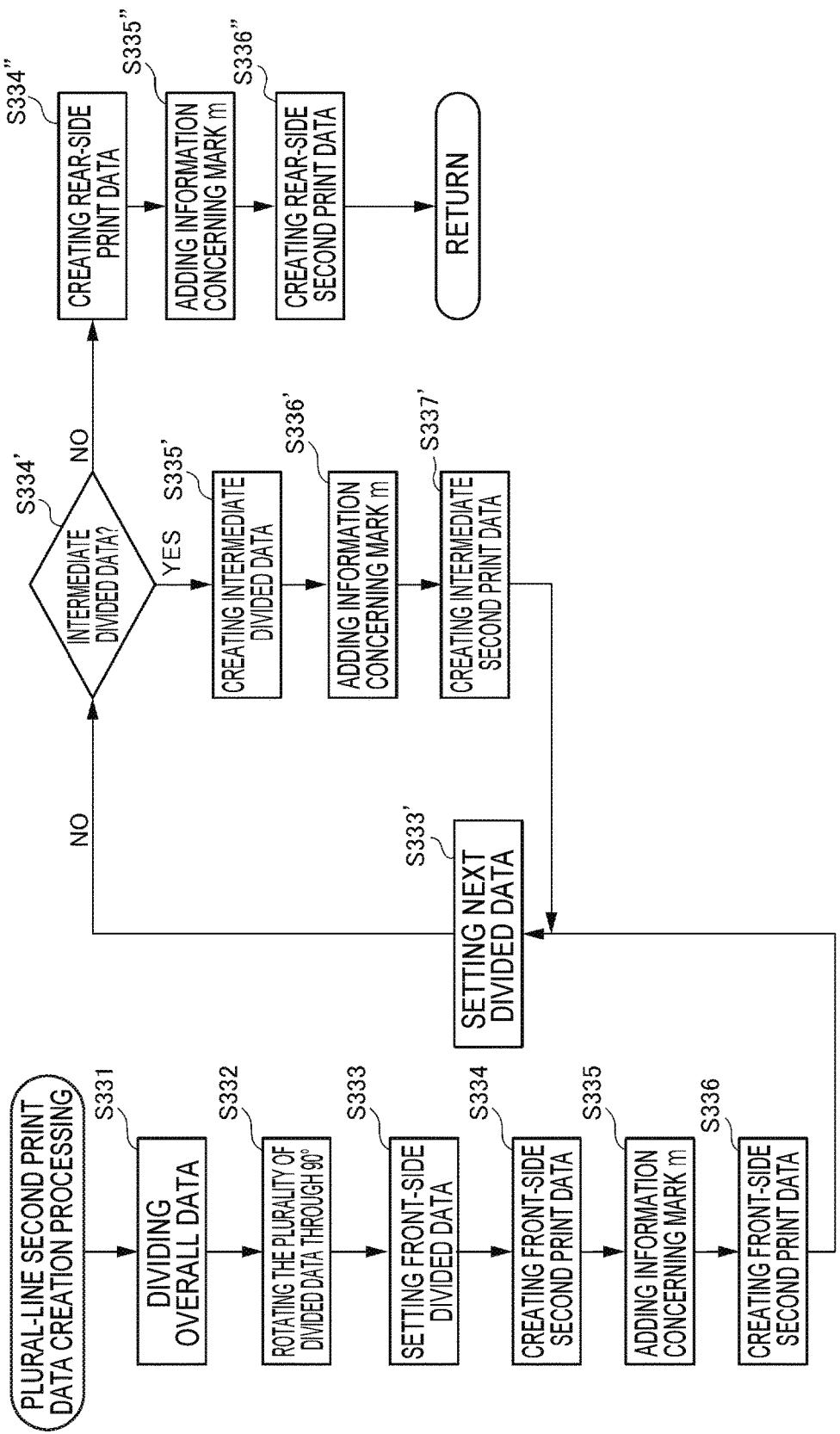
FIG. 16 is a flowchart for plural-line print data creation processing in second print data creation processing.

The contents of the plural-line second print data creation processing (step S33) will be described in detail next with reference to FIG. 16, which is a flowchart for the plural-line second print data creation processing (step S33) in the second print data creation processing (step S30).

Figure 17:
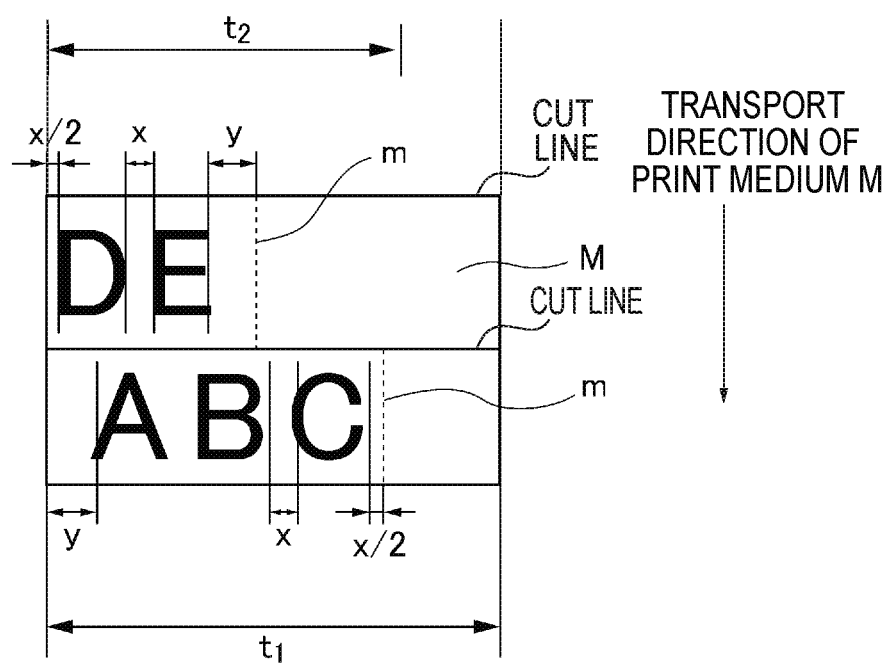
FIG. 17 is a schematic view of a print medium on which printing is performed along the widthwise direction with cut marks being added in accordance with 2-line second print data.
Figure 18:
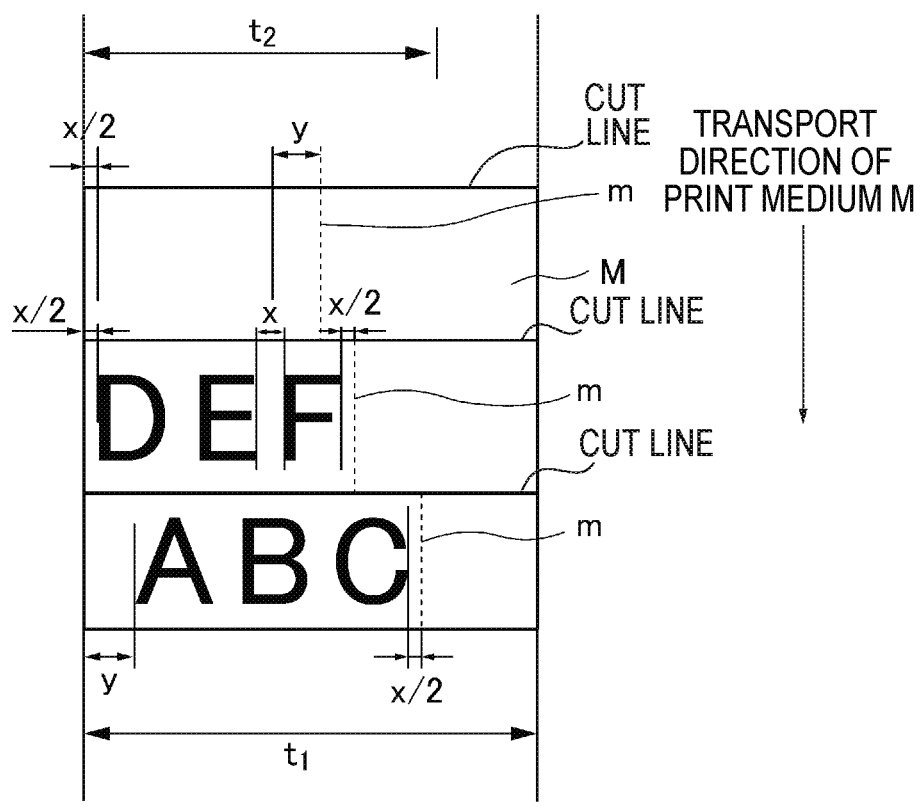
FIG. 18 is a schematic view of a print medium on which printing is performed along the widthwise direction with cut marks being added in accordance with 3-line second print data.

Note that FIG. 17 is a schematic view of the print medium M printed along the widthwise direction, with the marks m being added in accordance with 2-line second print data as an example of plural-line second print data, and FIG. 18 is a schematic view of the print medium M printed along the widthwise direction, with the marks m being added in accordance with 3-line second print data as an example of plural-line second print data.

First of all, in step S331, the processor 5 divides overall data obtained by adding margins each having the predetermined width y to the front and rear ends of a plurality of printable character strings based on input data into a plurality of data each falling within the second length t2.

Note that in the processing of creating a plurality of data by dividing the overall data in step S331, the processor 5 creates each data such that when the overall data is divided into a plurality of data along the intermediate position between adjacent printable characters of a plurality of printable character strings, each data has the maximum width falling within the second length t2.

Assume that, as shown in FIG. 17, overall data can be divided into two parts each falling within the second length t2, that is, the overall data is divided into front-side divided data (margin+ABC) and rear-side divided data (DE+margin). In this case, the front-side divided data has the maximum width falling within the second length t2 when the overall data is divided at the intermediate position between D and E, which are adjacent printable characters. Consequently, the boundary between the front-side divided data and the rear-side divided data coincides with the intermediate position between D and E.

Likewise, assume that, as shown in FIG. 18, overall data can be divided into three parts each falling within the second length t2, that is, the overall data is divided into front-side divided data (margin+ABC), intermediate divided data (DEF), and rear-side divided data (GH+margin). In this case, the front-side divided data has the maximum width falling within the second length t2 when the overall data is divided at the intermediate position between D and E, which are adjacent printable characters. Consequently, the boundary between the front-side divided data and the intermediate divided data coincides with the intermediate position between C and D. In addition, the intermediate divided data has the maximum width falling within the second length t2 when the overall data is divided at the intermediate position between F and G, which are adjacent printable characters. Consequently, the boundary between the intermediate divided data and the rear-side divided data coincides with the intermediate position between F and G.

Assume that when overall data is divided into four or more divided data, each divided data has the maximum length falling within the second length t2. In this case, all that happens is that a plurality of intermediated divided data are created.

In step S332, the processor 5 rotates the plurality of divided data through 90° to develop the data along the widthwise direction of the print medium M.

In step S333, the processor 5 sets the front-side divided data having undergone 90° rotation.

Subsequently, as shown in FIG. 17 or 18, in step S334, the processor 5 creates front-side print data so as to make the margin side of the front-side divided data coincide with one end (left end) of the print medium M.

Note that the front-side print data created in this manner is designed such that the position of the first margin coincides with one end (left end) of the print medium M in the widthwise direction.

As referred to above, when the process has shifted to second print data creation processing, because the first length t1 of the print medium M in the widthwise direction is longer than the second length t2 of the region in which the plurality of heat generating elements 10a of the thermal head 10 are provided in the widthwise direction, an unnecessary marginal portion is always formed on the other end (right end) side of the print medium M in the widthwise direction.

For this reason, subsequently, in step S335, the processor 5 adds the information concerning the mark m to the front-side print data so as to display the mark m at a position where the distance from the printable character string located closest to the other end side of the print medium M in the widthwise direction to the mark m after printing becomes ½ of the interval x between printable characters, as shown in FIG. 17 or 18.

Thereafter, in step S336, the processor 5 sets, as front-side second print data, the data obtained by adding the information concerning the mark m to the front-side print data.

Subsequently, the processor 5 sets the next divided data having undergone 90° rotation in step S333'.

In step S334', the processor 5 determines whether the set next divided data is intermediate divided data.

Upon determining that the next divided data is intermediate divided data (YES), the processor 5 shifts to step S335'. In contrast, upon determining that the next divided data is not intermediate divided data (NO), that is, the next divided data is the rear-side divided data, the processor 5 shifts to step S334".

Upon shifting to step S335', as shown in FIG. 18, the processor 5 creates intermediate print data so as to make that the front-side boundary of the intermediate divided data coincide with one end (left end) of the print medium M in the widthwise direction.

Note that the intermediate print data created in this manner is designed such that the distance from one end (left end) of the print medium M in the widthwise direction to the printable character string located closest to one end side of the print medium M in the widthwise direction is ½ of the interval x between printable characters.

Subsequently, as shown in FIG. 18, in step S336', the processor 5 adds the information concerning each mark m to intermediate print data so as to display the mark at a position where the distance from the printable character string located on the other side of the print medium M in the widthwise direction to the mark m after printing become ½ of the distance x.

In step S337', the processor 5 sets, as intermediate second print data, the data obtained by adding the information concerning the mark m to the intermediate print data.

When step S337' is completed, the process returns to step S333'.

That is, the processor 5 sets the next divided data having undergone 90° rotation.

Note that when the next divided data is the second intermediate divided data, the processor 5 performs the processing from step S334' to step S337' again to create the second intermediate second print data.

If, therefore, there are a plurality of intermediate divided data, the processor 5 creates intermediate second print data (first intermediate second print data, second intermediate second print data, . . . ) as many as the number of intermediate divided data.

If the divided data set after the process has shifted from step S336 or S337' to step S333' is rear-side divided data, NO is obtained in step S334'. In step S334", the processor 5 creates rear-side print data such that the boundary of the rear-side divided data coincides with one end (left end) of the print medium M in the widthwise direction, as shown in FIG. 17 or 18.

Note that the rear-side print data created in this manner is designed such that the distance from one end (left end) of the print medium M in the widthwise direction to the printable character string located closest to one end side of the print medium M in the widthwise direction is ½ of the interval x between printable characters.

As shown in FIG. 17 or 18, in step S335", the processor 5 adds the information concerning each mark m to the rear-side print data so as to display the mark m at a position where the distance from the printable character string located closest to the other end side of the print medium M in the widthwise direction to the mark m after printing becomes the predetermined width y.

Subsequently, in step S336", the processor 5 sets, as rear-side second print data, the print data obtained by adding the information concerning each mark m to the rear-side print data.

Figure 13:
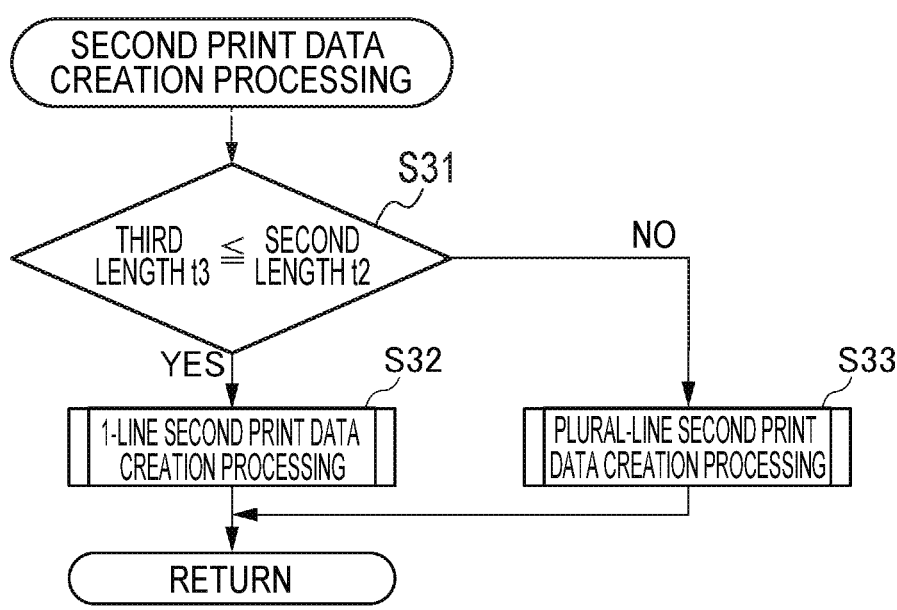
FIG. 13 is a flowchart for second print data creation processing.

When step S336" is completed and plural-line second print data having front-side second print data and rear-side second print data or plural-line second print data having front-side second print data, intermediate second print data (note that there are sometimes a plurality of intermediate second print data), and rear-side second print data is created, the process returns to the flowchart for the second print data creation processing (step S30) shown in FIG. 13.

With the above processing, plural-line second print data for printing like that shown in FIGS. 17 and 18 is created.

In this case as well, the processor 5 prints the marks m indicating the end portions of a plurality of print data such that when a plurality line second print data having a plurality of second print data are obtained by dividing the third length t3, which is the overall print length of the overall data, into second print data each falling within the first length t1, and the portions printed along the respective second print data are connected to each other after printing, the resultant data has the third length t3, and the intervals x between a plurality of printable character strings are equalized.

Accordingly, the user is only required to perform cutting along the marks m and connect the respective cut print media M to each other.

Note that in plural-line second print data creation processing (step S33), the boundary of print data need not always be the intermediate position between adjacent printable characters. As described above, however, the boundary of print data is preferably the intermediate position between adjacent printable characters.

In this embodiment, the margin having the predetermined width y is stored in the ROM 6 in advance. However, this is not exhaustive. For example, the user may input the predetermined width y as a variable. In this case, the input margin having the predetermined width y may be temporarily stored in the RAM 7.

In this embodiment, like the margin having the predetermined width y, the interval x between printable characters is stored in the ROM 6 in advance. However, this is not exhaustive. For example, the user may input the interval x of printable character strings as a variable. In this case, the input interval x between printable characters may be temporarily stored in the RAM 7.

Note that in this embodiment, the predetermined width y is set to be longer than the interval x between printable characters. However, this is not exhaustive. For example, the predetermined width y may be equal to or shorter than the interval x between printable characters.

Although the present invention has been described with reference to the specific embodiment, it should be noted that the present invention is not limited to the above embodiment, and the technical scope of the present invention includes various modifications and improvements within the range in which the object of the present invention is achieved. This is obvious to those skilled in the art from the description of the scope of claims.

What is claimed is:

1. A printing apparatus comprising:
   a width recognition portion configured to recognize a first length of an elongated print medium in a widthwise direction;
   a processor configured to create print data for printing at least one printable character so as to arrange the printable character along the widthwise direction of the print medium based on input data input by a user; and
   a printhead configured to print on the print medium in accordance with the print data,
   wherein:
   the processor compares an overall print length of overall data obtained by adding margins to a front end and a rear end of the printable character with the first length;
   when the overall print length is longer than the first length, the processor creates a plurality of pieces of print data such that (i) the overall print length is divided into the plurality of pieces of print data and each of the plurality of pieces of print data falls within the first length, and (ii) a boundary between continuous pieces of the divided print data coincides with a position halfway between an interval between adjacent printable characters contained within the continuous pieces of the divided print data; and
   when the overall print length is shorter than the first length, the processor creates the print data to include a mark indicating an end portion in a length direction of the overall data.

2. The printing apparatus according to claim 1, wherein the printhead has a plurality of elements provided on a line corresponding to the widthwise direction of the print medium and prints on the print medium by causing the plurality of elements to generate heat based on the print data, and
   wherein the processor performs first print data creation processing for creating the print data when a second length of a region in which the plurality of elements of the printhead are provided is longer than the first length.

3. The printing apparatus according to claim 1, wherein the processor creates each of the plurality of pieces of print data to include a mark indicating an end portion in a length direction thereof at a position such that a length obtained by connecting portions printed along the respective pieces of print data after printing is equal to the overall print length, and intervals between printable characters are equalized.

4. The printing apparatus according to claim 2, wherein:
   the processor performs second print data creation processing for creating the print data when the second length is shorter than the first length,
   the processor compares the overall print length with the second length, and the processor creates the print data to include the mark indicating the end portion in the length direction of the overall data when the overall print length is shorter than the second length.

5. The printing apparatus according to claim 4, wherein the processor creates a plurality of pieces of print data, in the second print data creation processing, such that when the overall print length is longer than the second length, each of the plurality of pieces of print data, obtained by dividing the overall print length, falls within the second length, and wherein the processor creates each of the plurality of pieces of print data to include a mark indicating an end portion in a length direction thereof such that a length obtained by connecting portions printed along the respective pieces of print data after printing is equal to the overall print length, and intervals between printable characters are equalized.

6. A printing method of printing on an elongated print medium by using a printhead, the method comprising:

recognizing a first length of the print medium in a widthwise direction;

creating print data for printing at least one printable character so as to arrange the printable character along the widthwise direction of the print medium based on input data input by a user; and printing on the print medium in accordance with the print data, wherein the creating the print data comprises:

comparing an overall print length of overall data obtained by adding margins to a front end and a rear end of the printable character based on the input data with the first length;

when the overall print length is longer than the first length, creating a plurality of pieces of print data such that (i) the overall print length is divided into the plurality of pieces of print data and each of the plurality of pieces of print data falls within the first length, and (ii) a boundary between continuous pieces of the divided print data coincides with a position halfway between an interval between adjacent printable characters contained within the continuous pieces of the divided print data; and when the overall print length is shorter than the first length, creating the print data to include, on the print medium, a mark indicating an end portion in a length direction of the overall data.

7. A non-transitory recording medium recording a program readable by a computer of a printing apparatus, the program causing a processor of the printing apparatus to execute:

a process of recognizing a first length of an elongated print medium in a widthwise direction;

a process of creating print data for printing at least one printable character so as to arrange the printable character along the widthwise direction of the print medium based on input data input by a user; and a process of printing on the print medium in accordance with the print data, wherein the process of creating the print data comprises:

comparing an overall print length of overall data obtained by adding margins to a front end and a rear end of the printable character based on the input data with the first length;

when the overall print length is longer than the first length, creating a plurality of pieces of print data such that (i) the overall print length is divided into the plurality of pieces of print data and each of the plurality of pieces of print data falls within the first length, and (ii) a boundary between continuous pieces of the divided print data coincides with a position halfway between an interval between adjacent printable characters contained within the continuous pieces of the divided print data; and when the overall print length is shorter than the first length, creating the print data to include, on the print medium, a mark indicating an end portion in a length direction of the overall data.

\* \* \* \* \*